United States Patent
Parrish et al.

(10) Patent No.: US 9,347,395 B2
(45) Date of Patent: May 24, 2016

(54) METHOD FOR IMPROVING CLOSELY-SPACED MULTIPLE-INJECTION PERFORMANCE FROM SOLENOID ACTUATED FUEL INJECTORS

(71) Applicant: GM GLOBAL TECHNOLOGY OPERATIONS LLC, Detroit, MI (US)

(72) Inventors: Scott E. Parrish, Farmington Hills, MI (US); Paul M. Najt, Bloomfield Hills, MI (US); Ronald J. Zink, Macomb, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 330 days.

(21) Appl. No.: 13/973,022

(22) Filed: Aug. 22, 2013

(65) Prior Publication Data
US 2015/0053183 A1 Feb. 26, 2015

(51) Int. Cl.
| | |
|---|---|
| F02D 41/40 | (2006.01) |
| F02D 41/20 | (2006.01) |
| F02D 41/30 | (2006.01) |
| F02D 41/24 | (2006.01) |

(52) U.S. Cl.
CPC .............. *F02D 41/402* (2013.01); *F02D 41/20* (2013.01); *F02D 41/2467* (2013.01); *F02D 41/2487* (2013.01); *F02D 41/3005* (2013.01); *F02D 41/403* (2013.01); *F02D 41/405* (2013.01); *F02D 2041/2058* (2013.01); *F02D 2200/0614* (2013.01)

(58) Field of Classification Search
CPC ... F02D 41/402; F02D 41/403; F02D 41/405; F02D 41/20; F02D 41/40; F02D 2041/2058
USPC ................ 123/478, 299, 300, 304, 490, 499; 239/585.1; 701/103, 105
See application file for complete search history.

(56) References Cited

U.S. PATENT DOCUMENTS

| | | | | |
|---|---|---|---|---|
| 5,515,830 | A * | 5/1996 | Arakowa | F02D 41/20 123/490 |
| 7,013,876 | B1 * | 3/2006 | Puckett | F02D 41/20 123/490 |
| 2003/0015599 | A1 * | 1/2003 | Carroll, III | F02M 45/086 239/88 |
| 2003/0062029 | A1 * | 4/2003 | Oyama | F02D 41/20 123/490 |
| 2009/0217914 | A1 * | 9/2009 | Casasso | F02D 41/20 123/490 |
| 2009/0287393 | A1 * | 11/2009 | Moller | F02D 41/20 701/103 |
| 2011/0100333 | A1 * | 5/2011 | Toyohara | F02D 41/20 123/490 |
| 2012/0080536 | A1 | 4/2012 | Parrish et al. | |

* cited by examiner

Primary Examiner — Mahmoud Gimie

(57) ABSTRACT

A method for controlling an electromagnetically-activated fuel injector includes, when a plurality of fuel injection events are close-spaced during an engine cycle, monitoring a respective desired injected fuel mass for each of the plurality of fuel injection events. A desired current wave form is selected from a plurality of current waveforms whereat each respective desired injected fuel mass is achieved based on at least one of the fuel injection events. The fuel injector is controlled using the desired current waveform.

17 Claims, 3 Drawing Sheets

METHOD FOR IMPROVING CLOSELY-SPACED MULTIPLE-INJECTION PERFORMANCE FROM SOLENOID ACTUATED FUEL INJECTORS

TECHNICAL FIELD

This disclosure is related to solenoid-activated fuel injectors employed on internal combustion engines.

BACKGROUND

The statements in this section merely provide background information related to the present disclosure. Accordingly, such statements are not intended to constitute an admission of prior art.

Fuel injectors are used to directly inject pressurized fuel into combustion chambers of internal combustion engines. Known fuel injectors include electromagnetically-activated solenoid devices that overcome mechanical springs to open a valve located at a tip of the injector to permit fuel flow therethrough. Injector driver circuits control flow of electric current to the electromagnetically-activated solenoid devices to open and close the injectors. Injector driver circuits may operate in a peak-and-hold control configuration or a saturated switch configuration.

Fuel injectors are calibrated, with a calibration including an injector activation signal including an injector open-time, or injection duration, and a corresponding metered or delivered injected fuel mass operating at a predetermined or known fuel pressure. Injector operation may be characterized in terms of injected fuel mass per fuel injection event in relation to injection duration. Injector characterization includes metered fuel flow over a range between high flowrate associated with high-speed, high-load engine operation and low flowrate associated with engine idle conditions. Advanced engine operations, such as homogeneous-charge compression ignition (HCCI) and spray-guided-stratified-charge engines, sometimes utilize a plurality of fuel injection events in rapid succession, each including an injected fuel mass relatively small in magnitude.

It is known for engine controls to benefit from injecting a plurality of small injected fuel masses in rapid succession. Generally, when a dwell time between consecutive injection events is less than a dwell time threshold, injected fuel masses of subsequent fuel injection events often result in a larger delivered magnitude than what is desired even through equal injection durations are utilized. This undesirable occurrence is attributed to the existence of a residual magnetic field produced by the preceding fuel injection event that offers some assistance to the immediately subsequent fuel injection event. It is known to compensate for the effect of the larger than desired delivered magnitude of injected fuel mass by adjusting the injection duration of the subsequent injection event; however, the corresponding subsequent fuel injection can become unstable resulting in unacceptable repeatability.

SUMMARY

A method for controlling an electromagnetically-activated fuel injector includes, when a plurality of fuel injection events are close-spaced during an engine cycle, monitoring a respective desired injected fuel mass for each of the plurality of fuel injection events. A desired current wave form is selected from a plurality of current waveforms whereat each respective desired injected fuel mass is achieved based on at least one of the fuel injection events. The fuel injector is controlled using the desired current waveform.

BRIEF DESCRIPTION OF THE DRAWINGS

One or more embodiments will now be described, by way of example, with reference to the accompanying drawings, in which:

FIGS. 3-1 through 3-4 illustrate an exemplary mapping process carried out for one of the current waveforms of FIG. 2 applied to first and second fuel injection events of a closely-spaced consecutive pair, in accordance with the present disclosure; and FIGS. 4-1 through 4-4 illustrate an exemplary mapping process carried out for the other one of the current waveforms of FIG. 2 applied to first and second fuel injection events of a closely-spaced consecutive pair, in accordance with the present disclosure.

DETAILED DESCRIPTION

Figure 1:
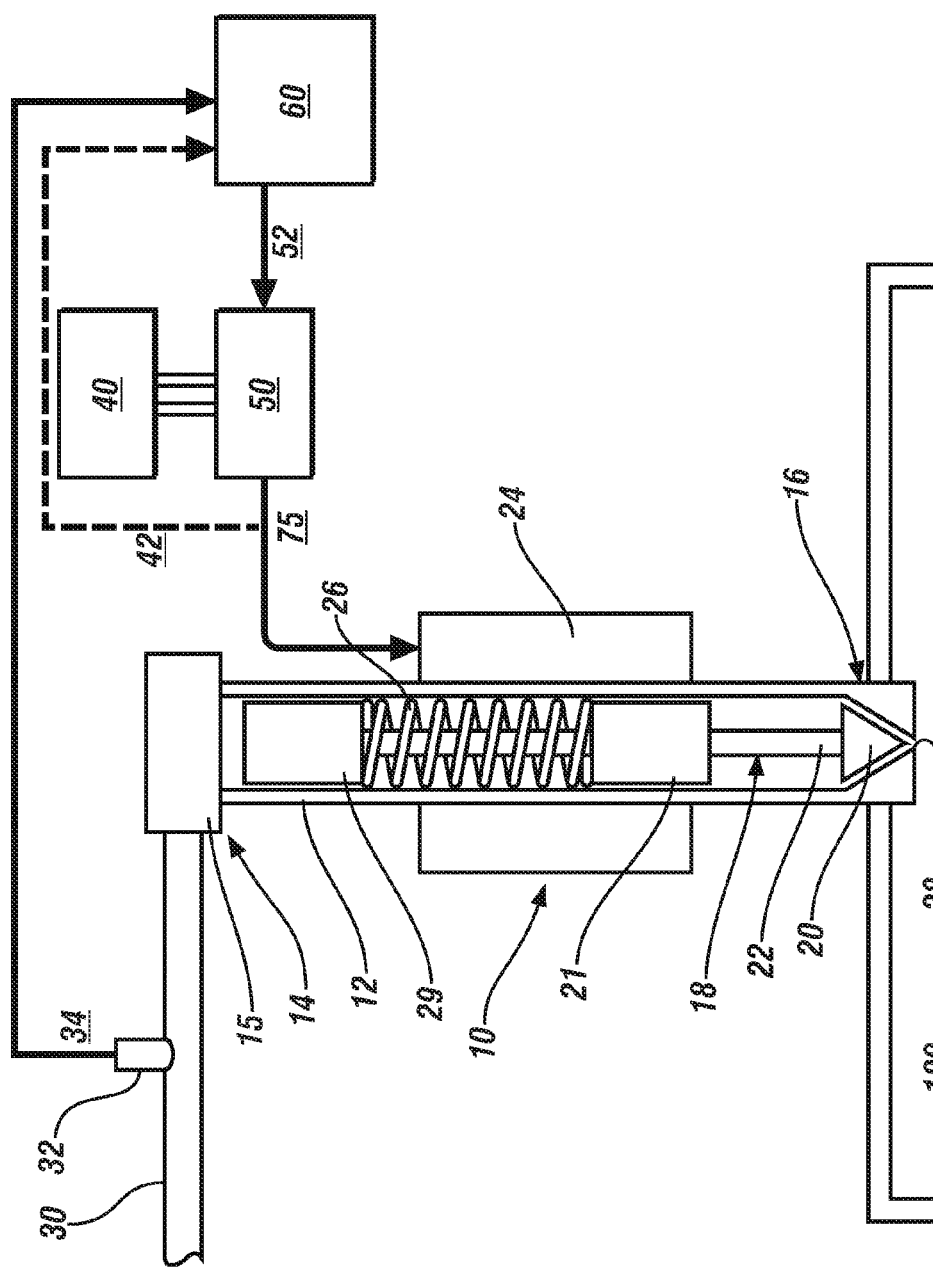
FIG. 1 illustrates a schematic sectional view of a fuel injector and control system, in accordance with the present disclosure.

Referring now to the drawings, wherein the showings are for the purpose of illustrating certain exemplary embodiments only and not for the purpose of limiting the same, FIG. 1 schematically illustrates an embodiment of an electromagnetically-activated fuel injector 10. The electromagnetically-activated direct-injection fuel injector 10 is configured to injected fuel directly into a combustion chamber 100 of an internal combustion engine. While an electromagnetically-activated direct-injection fuel injector is depicted in the illustrated embodiment, a port-injection fuel injector is equally applicable. A control module 60 electrically operatively connects to an injector driver 50 that electrically operatively connects the fuel injector 10 to control activation thereof. The fuel injector 10, control module 60 and injector driver 50 may be any suitable devices that are configured to operate as described herein.

The fuel injector 10 may be any suitable discrete fuel injection device that is controllable to one of an open position and a closed position. In one embodiment, the fuel injector 10 includes a cylindrically-shaped hollow body 12 defining a longitudinal axis. A fuel inlet 15 is located at a first end 14 of the body 12 and a fuel nozzle 28 is located at a second end 16 of the body 12. The fuel inlet 15 fluidly coupled to a high-pressure fuel line 30 that fluidly couples to a high-pressure injection pump. A valve assembly 18 is contained in the body 12, and includes a needle valve 20 and a spring-activated plunger 22. The needle valve 20 interferingly fits in the fuel nozzle 28 to control fuel flow therethrough. An annular electromagnetic coil 24 is configured to magnetically engage a guide portion 21 of the valve assembly 18. When the electromagnetic coil 24 is deactivated, a spring 26 urges the valve assembly 18 including the needle valve 20 toward the fuel nozzle 28 to close the needle valve 20 and prevent fuel flow therethrough. When the electromagnetic coil 24 is activated, electromagnetic force acts on the guide portion 21 to overcome the spring force exerted by the spring 26 and urges the valve assembly 18 open, moving the needle valve 20 away from the fuel nozzle 28 and permitting flow of pressurized fuel within the valve assembly 18 to flow through the fuel nozzle 28. The fuel injector 10 may include a stopper 29 that interacts with the valve assembly 18 to stop translation of the valve assembly 18 when it is urged to open. In one embodiment, a pressure sensor 32 is configured to monitor fuel pressure 34 in the high-pressure fuel line 30 proximal to the fuel injector 10, preferably upstream of the fuel injector 10. In an engine configuration employing a common-rail fuel injection system, a single pressure sensor 32 may be employed to monitor fuel pressure 32 in the high-pressure fuel line 30 for a plurality of fuel injectors 10. It is appreciated that other configurations for fuel pressure monitoring proximal to the fuel injector 10 may be employed. The control module 60 monitors signal outputs from the pressure sensor 32 to determine the fuel pressure 34 proximal to the fuel injector 10.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 60 generates an injector command signal 52 that controls the injector driver 50, which activates the fuel injector 10 to effect a fuel injection event. The injector command signal 52 correlates to a mass of fuel delivered by the fuel injector 10 during the fuel injection event. As used herein, the term "delivered injected fuel mass" refers to the mass of fuel delivered by the fuel injector 10. The injector driver 50 generates an injector activation signal 75 in response to the injector command signal 52 to activate the fuel injector 10. The injector activation signal 75 controls current flow to the electromagnetic coil 24 to generate electromagnetic force in response to the injector command signal 52. An electric power source 40 provides a source of DC electric power for the injector driver 50. When activated using the injector activation signal 75, the electromagnetic coil 24 generates electromagnetic force to urge the valve assembly 18 open, allowing pressurized fuel to flow therethrough. The injector driver 50 controls the injector activation signal 75 to the electromagnetic coil 24 by any suitable method, including, e.g., pulsewidth-modulate electric power flow. The injector driver 50 is configured to control activation of the fuel injector 10 by generating suitable injector activation signals 75. In embodiments that employ a plurality of successive fuel injection events for a given engine cycle, an injector activation signal 75, that is fixed for each of the fuel injection events within the engine cycle, is generated.

The injector activation signal 75 is characterized by an injection duration and a current waveform that includes an initial peak pull-in current and a secondary hold current. The initial peak pull-in current is characterized by a steady-state ramp up to achieve a peak current, which may be selected as described herein. The initial peak pull-in current generates electromagnetic force in the electromagnetic coil 25 that acts on the guide portion 21 of the valve assembly 18 to overcome the spring force and urge the valve assembly 18 open, initiating flow of pressurized fuel through the fuel nozzle 28. When the initial peak pull-in current is achieved, the injector driver 40 reduces the current in the electromagnetic coil 24 to the secondary hold current. The secondary hold current is characterized by a somewhat steady-state current that is less than the initial peak pull-in current. The secondary hold current is a current level controlled by the injector driver 50 to maintain the valve assembly 18 in the open position to continue the flow of pressurized fuel through the fuel nozzle 28. The secondary hold current is preferably indicated by a minimum current level.

As used herein, the term "injection duration" refers to a time that begins with initiation of the initial peak pull-in current and ends when the secondary hold current is released, thus deactivating the electromagnetic coil 24. Furthermore, as used herein, the term "respective injection duration" will refer to the injection duration respective to a fuel injection event whereat a respective delivered injected fuel mass achieves a respective desired injected fuel mass. Described in greater detail below, the respective injection duration of each fuel injection event can be obtained through an exemplary mapping process executed by the control module 60. When the electromagnetic coil 24 is deactivated, the electric current and corresponding electromagnetic force dissipate and the spring urges the valve assembly 18 toward the nozzle 28, thus closing the fuel injector 10 and discontinuing fuel flow therethrough. The injection duration may be defined as a pulsewidth, preferably measured in milliseconds (ms).

Embodiments herein are directed toward controlling the fuel injector for a plurality of fuel injection events that are closely-spaced during an engine cycle. As used herein, the term "closely-spaced" refers to a dwell time between each consecutive fuel injection event being less than a dwell time threshold. As used herein, the term "dwell time" refers to a period of time between an end of injection for the first fuel injection event and a start of injection for a corresponding second fuel injection event of each consecutive pair of fuel injection events. The dwell time threshold can be selected to define a period of time such that dwell times less than the dwell time threshold are indicative of producing instability and/or deviations in the magnitude of injected fuel mass delivered for each of the fuel injection events. Accordingly, the dwell time threshold is not defined by any fixed value, and selection thereof may be based upon, but not limited to, fuel temperature, fuel injector temperature, fuel injector type, fuel pressure and fuel properties such as fuel types and fuel blends.

For fuel injection events that are not closely spaced, a fixed current waveform independent of dwell time may be utilized for each fuel injection event because the first fuel injection event of a consecutive pair has little influence on the delivered injected fuel mass of the second fuel injection event of the consecutive pair. However, the first fuel injection event may be prone to influence the delivered injected fuel mass of the second fuel injection event, and/or further subsequent fuel injection events, when the first and second fuel injection events are closely-spaced and a fixed current wave form is utilized. Any time a fuel injection event is influenced by one or more preceding fuel injection events of an engine cycle, the respective delivered injected fuel mass of the corresponding fuel injection event can result in an unacceptable repeatability over the course of a plurality of engine cycles. Accordingly, embodiments herein may variably select a desired current waveform as needed to achieve acceptable repeatability of delivered injected fuel masses using an exemplary mapping process executed by the control module 60. It will be appreciated that while the desired current waveform is variably selected amongst a plurality of current waveforms, exemplary embodiments herein are directed toward the desired current waveform, once selected, to remain fixed for each closely-spaced fuel injection event. As used herein, the term "acceptable repeatability of delivered injected fuel masses" refers to each delivered injected fuel mass achieving respective desired injected fuel masses over a plurality of engine cycles, wherein the respective desired injected fuel mass for each fuel injection event can be selected to achieve desired drivability, fuel economy and emissions.

As will become apparent, a plurality of current waveforms defined by dwell times can be stored in the control module 60. A desired current wave form whereat the respective delivered injected fuel mass repeatedly achieves the respective desired injected fuel mass for each fuel injection event can be selected through the mapping process taking into account injection duration and delivered injected fuel mass of one or more of a plurality of closely-spaced fuel injection events. In some embodiments, selection of the desired current waveform uses the respective injection duration for one or more preceding fuel injection events in addition to the respective injection duration for the corresponding fuel injection event. In a non-limiting example, for an engine cycle utilizing a triple fuel injection wherein each of the fuel injection events are closely-spaced, the third injection event may map the injection duration of the second fuel injection event and the injection duration of the corresponding third fuel injection event, in addition to the injection duration of the first fuel injection event, to determine if the delivered injection fuel mass of the corresponding third fuel injection event repeatedly achieves the respective desired injected fuel mass for a given current waveform being applied thereto. In this example, the first and second fuel injection events correspond to one consecutive pair of closely-spaced fuel injection events and the second and third fuel injection events correspond to another consecutive pair of closely-spaced fuel injection events.

Exemplary embodiments herein are directed toward the desired current waveform selected being identical for each of the plurality of closely-spaced fuel injection events. Thus, a fixed current waveform is not linearly selected using a look up table, but rather, the desired current waveform is variably selected through mapping injection duration versus delivered injected fuel mass for each of the fuel injection events to ensure the delivered injected fuel mass repeatedly achieves the respective desired injected fuel mass for each fuel injection event. Accordingly, the injector activation signal 75 including the desired current waveform can be received by the injector driver 50 for controlling the fuel injector 10 for each of the closely-spaced fuel injection events during the engine cycle. Alternative embodiments are envisioned wherein at least one of the fuel injection events may have a respective desired current waveform selected that is different from the respective desired current waveforms of the other closely-spaced fuel injection events.

Figure 2:
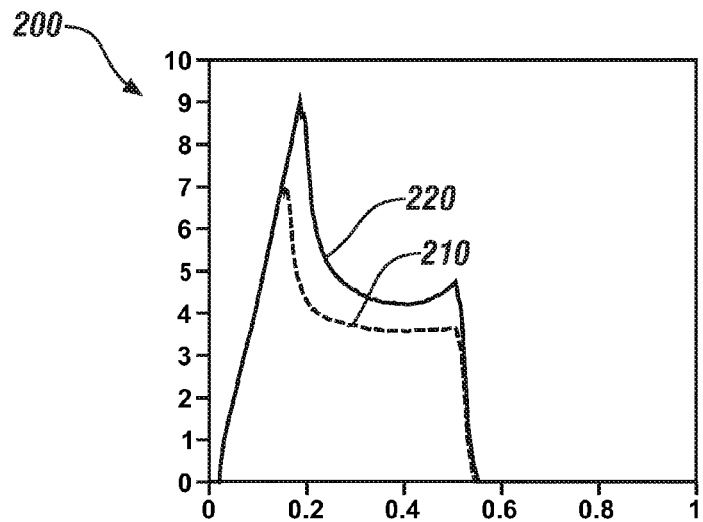
FIG. 2 illustrates an exemplary plot of current profiles for two current waveforms over an injection duration, in accordance with the present disclosure.

FIG. 2 illustrates an exemplary plot 200 of current profiles for two current waveforms over an injection duration, in accordance with the present disclosure. The vertical y-axis denotes electrical current in Amperage (A) and the horizontal x-axis denotes time in milliseconds (ms). The first current waveform 210 is characterized by a peak pull-in current of 7 A and a secondary hold current of 3.5 A. The second current waveform 220 is characterized by a peak pull-in current of 9 A and a secondary hold current of 4.5 A. Each of the first and second current waveforms 210, 220, respectively, includes an injection duration of about 0.55 ms. It will be further appreciated that each of the current waveforms 210 and 220 are indicative of a respective injector activation signal 75 received by the injector driver 50 for controlling the fuel injector 10.

The exemplary mapping process variably selects a desired current waveform among a plurality of current waveforms stored in the control module 60 whereat respective ones of the desired injected fuel masses of each fuel injection event is achieved based on at least one of a plurality of closely-spaced fuel injection events. Specifically, for each of the stored plurality of current waveforms, the mapping process for selecting the desired current waveform first includes mapping injection duration versus delivered injected fuel mass for each of the fuel injection events. Thereafter, a respective injection duration whereat a respective delivered injected fuel mass achieves a respective desired injected fuel mass for each fuel injection event may be selected. Second, additional mapping is executed by the control module 60 to select the desired current waveform based on a determination whereat the respective delivered injected fuel mass repeatedly achieves the respective desired injected fuel mass for each fuel injection event. As used herein, each respective delivered injected fuel mass "repeatedly achieves" the respective desired injected fuel mass when the respective delivered injected fuel mass includes an actual deviation from the respective desired injected fuel mass that does not violate a deviation threshold. In some embodiments, the deviation threshold can be violated when the actual deviation is greater than a value corresponding to the deviation threshold. For instance, an actual deviation over 0.1 mg may violate the deviation threshold. In other embodiments, the deviation threshold can be violated when a ratio of the actual deviation to the respective desired injected fuel mass is greater than a predetermined ratio. For instance, a ratio of the actual deviation to the respective desired injected fuel that is greater than 25% may violate the deviation threshold. This disclosure is not limited to any specific value for the deviation threshold.

Figures 1, 3:
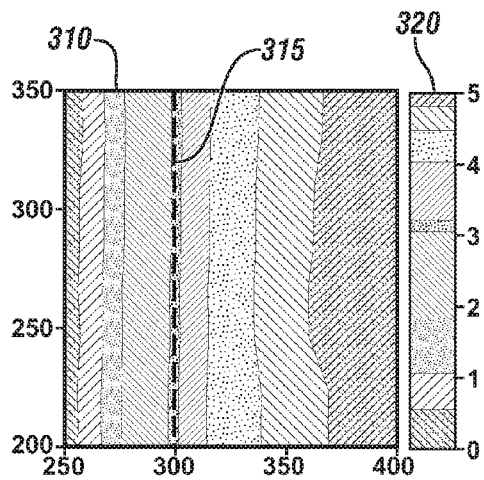
Figures 2, 3:
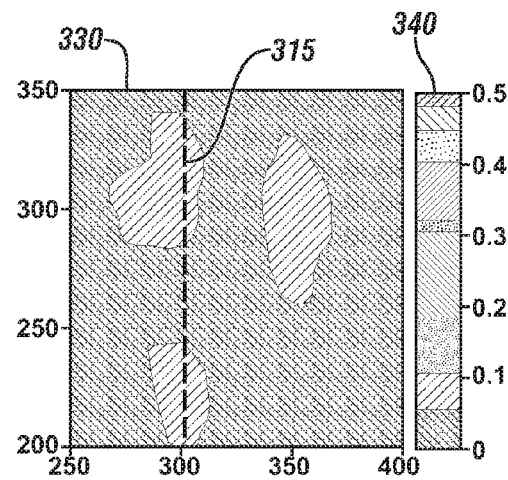
Figure 3:
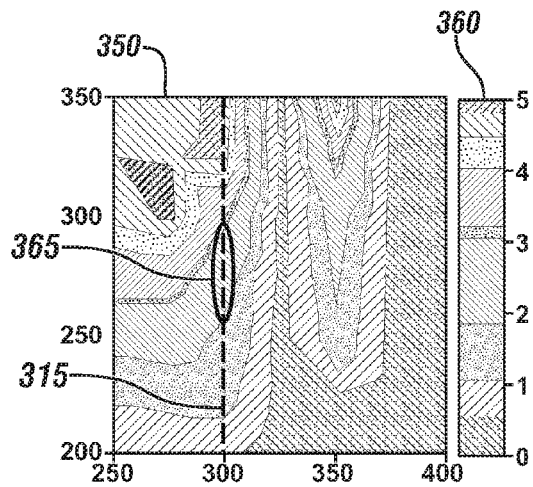
Figures 3, 4:
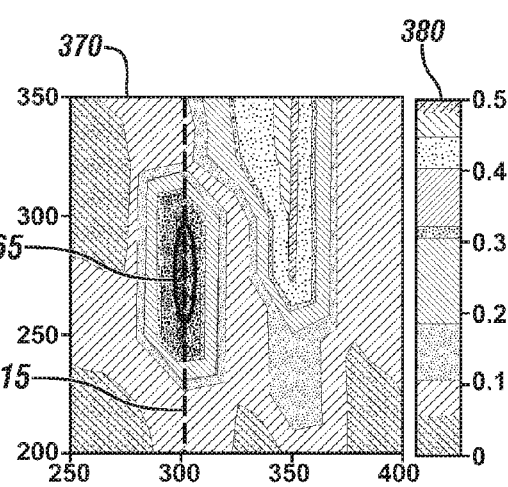
Figures 1, 4:
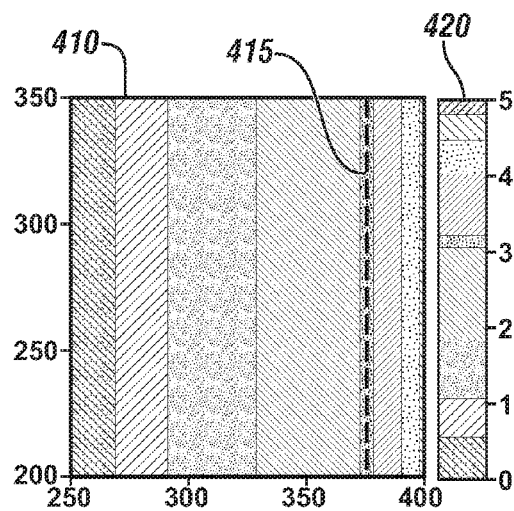
Figures 2, 4:
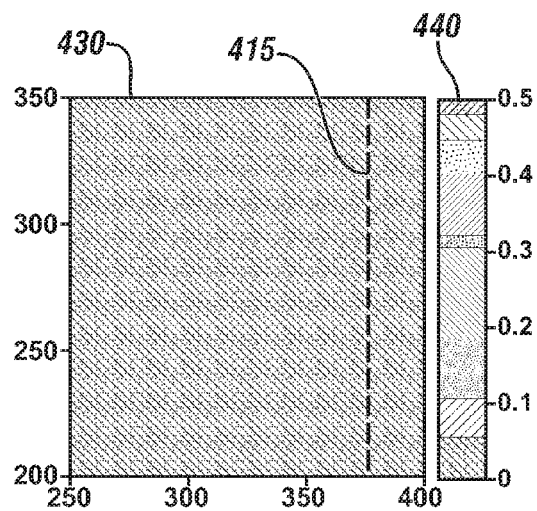
Figures 3, 4:
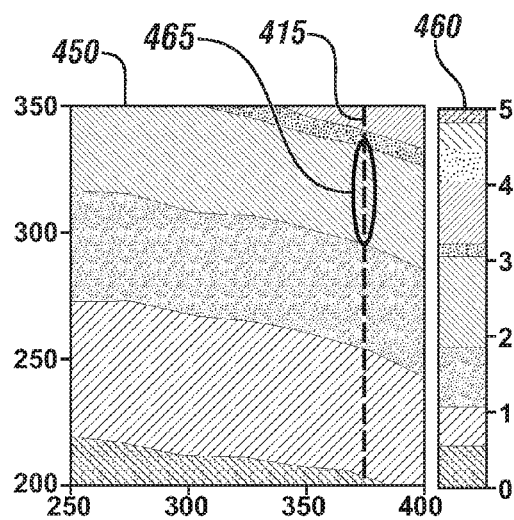
Figure 4:
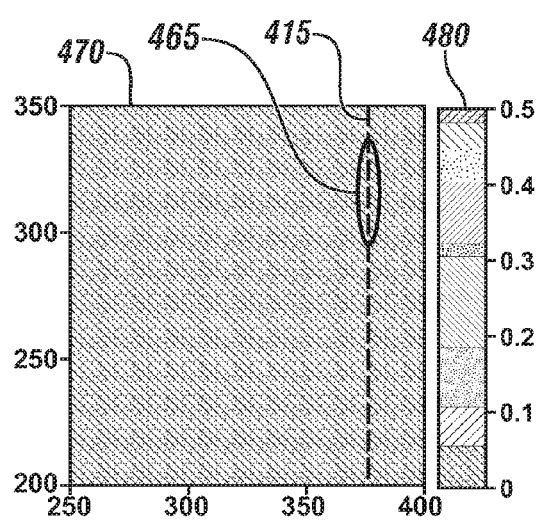

FIGS. 3-1 through 3-4 illustrate the exemplary mapping process executed by the control module for the second current waveform 220 of FIG. 2 applied to first and second fuel injection events of a consecutive pair having a dwell time of 1 ms. It will be appreciated that the exemplary maps are predetermined and stored within the control module 60. FIGS. 4-1 through 4-4 illustrate the exemplary mapping process executed by the control module 60 for the first current waveform 210 of FIG. 2 applied to the same first and second fuel injection events of the consecutive pair having the dwell time of 1 ms. In the illustrated embodiment, the dwell time threshold is 2 ms rendering the consecutive pair with the dwell time of 1 ms as "closely-spaced." In the illustrated embodiments, the first and second fuel injection events of the consecutive pair correspond to a double fuel injection event. However, embodiments are envisioned where engine operation can include a plurality of fuel injection events such as, but not limited to, triple and quadruple fuel injection events. Accordingly, as used herein, the term "consecutive pair" can include any two fuel injection events among a plurality of fuel injection events that are performed in succession. For instance, the first and second fuel injection events of the corresponding pair could correspond to second and third fuel injection events of a triple fuel injection event or they could correspond to first and second fuel injection events of the triple fuel injection event.

Referring to FIG. 3-1, a first delivered injected fuel mass map 310 and an injected fuel mass key 320 are illustrated with respect to the second current waveform 220 applied to the first fuel injection event of the consecutive pair, in accordance with the present disclosure. The injected fuel mass key 320 includes a key for desired injected fuel masses ranging in magnitude from 0 to 5 mg. It will be appreciated that the desired injected fuel mass of the first fuel injection event is a known value that can be selected to assist in meeting an operator torque request while achieving desired drivability, fuel economy and emissions. The horizontal x-axis denotes the injection duration (ms) of the first fuel injection event and the vertical y-axis denotes the injection duration (ms) of the second fuel injection event. In the illustrated embodiment, since the second fuel injection event is subsequent in succession to the first fuel injection event, the injection duration of the second fuel injection event does not influence the first fuel injection event. The contrasted regions within the map 310 are indicative of magnitudes of delivered injected fuel mass of the first injected fuel mass metered by injection duration. In the illustrated embodiment of FIG. 3-1, the magnitude of the delivered injected fuel mass increases as the injection duration of the first fuel injection mass increases. The magnitude of the delivered injected fuel mass that achieves the known respective desired injected fuel mass can be obtained from the key 320. Accordingly, dashed vertical line 315 represents a selected injection duration respective to the first fuel injection event whereat the delivered injected fuel mass respective to the first fuel injection event achieves the respective desired injected fuel mass. In other words, dashed vertical line 315 is indicative of an injection duration of the first fuel injection event that delivers an injected fuel mass equal to the respective desired injected fuel mass. In the illustrated embodiment, the desired injected fuel mass is 3 mg and the injection duration is 300 ms for the first fuel injection event. Accordingly, the second current waveform 220 delivers an injected fuel mass of 3 mg when the injection duration of the first fuel injection event is 300 ms.

FIG. 3-2 illustrates a first delivered injected fuel mass deviation map 330 and a deviation key 340 respect to the first fuel injection event of the consecutive pair when the first current wave from 210 of FIG. 2 is applied, in accordance with the present disclosure. The deviation key 340 includes actual deviations from 0 to 0.5 mg of the delivered injected fuel mass from the respective desired injected fuel mass respective to the first fuel injection event, wherein "0" is indicative of no deviation. Similar to the first delivered injected fuel mass map 310 of FIG. 3-1, the horizontal x-axis denotes the injection duration (ms) of the first fuel injection event and the vertical y-axis denotes the injection duration (ms) for the second fuel injection event. The contrasted regions within the map 330 are indicative of the actual deviations. Dashed vertical line 315 represents the injection duration respective to the first fuel injection event described above with reference to the first delivered injected fuel mass map 310 of FIG. 3-1. As aforementioned, the first fuel injection event is not influenced by any preceding fuel injection events. Thus, the determined actual deviation from the respective desired injected fuel mass for the first fuel injection event uses only the respective injection duration selected for the first fuel injection event. As a result, there is little to no deviation from the respective desired injected fuel mass.

Referring now to FIG. 3-3, a second delivered injected fuel mass map 350 and an injected fuel mass key 360 are illustrated with respect to the second current waveform 220 applied to the second fuel injection event of the consecutive pair, in accordance with the present disclosure. The injected fuel mass key 360 includes a key for desired injected fuel masses ranging in magnitude from 0 to 5 mg. Similar to the first fuel injection event, desired injected fuel mass of the second fuel injection event is known. The horizontal x-axis denotes the injection duration (ms) of the first fuel injection event and the vertical y-axis denotes the injection duration (ms) of the second fuel injection event. In the illustrated embodiment, since the second fuel injection event is subsequently closely-spaced in succession to the first fuel injection, the injection duration of the first fuel injection event influences the delivered injected fuel mass of the second fuel injected mass. The contrasted regions within the map 350 are indicative of magnitudes of the delivered injected fuel mass of the second fuel injection event metered by the second fuel injection event and influenced by the injection duration of the first fuel injection event, e.g., 300 mg. In the illustrated embodiment of FIG. 3-3, the magnitude of the delivered injected fuel mass does not increase or decrease in any linear manner in relation to injection duration due to the influence by the closely-spaced preceding first fuel injection event. The magnitude of the delivered injected fuel mass that achieves the known respective desired injected fuel mass of the second fuel injection event can be obtained from the key 360. Accordingly, region 365 represents a range of permissible injection durations respective to the second fuel injection event that can be selected whereat the delivered injected fuel mass respective to the second fuel injection event achieves the respective desired injected fuel mass. In the illustrated embodiment, the region 365 is determined based on the selected injection duration of the first fuel injection event (i.e., dashed vertical line 315) and the delivered injected fuel mass that achieves the known respective desired injected fuel mass of the second fuel injection event obtained from the key 360. In other words, the region 365 is indicative of a range of permissible injection durations respective to the second fuel injection event, and influenced by the immediately preceding closely-spaced first fuel injection event, that delivers an injected fuel mass equal to the respective desired injection fuel mass. In the illustrated embodiment, the desired injected fuel mass respective to the second fuel injection event is about 2.5 mg and the range of permissible injection durations respective to the second fuel injection event is from about 260 ms to about 280 ms. Accordingly, the second current waveform 220 delivers an injected fuel mass of 2.5 mg when the injection duration of the first fuel injection event is 300 ms and the injection duration of the second fuel injection event is within a range of about 260 ms to 280 ms.

FIG. 3-4 illustrates a second delivered injected fuel mass deviation map 370 and a deviation key 380 with respect to the second current waveform 220 applied to second fuel injection event of the consecutive pair, in accordance with the present disclosure. The deviation key 380 includes actual deviations from 0 to 0.5 mg, wherein "0" is indicative of no deviation. Similar to the second delivered injected fuel mass map 350 of FIG. 3-3, the horizontal x-axis denotes the injection duration (ms) of the first fuel injection event and the vertical y-axis denotes the injection duration (ms) for the second fuel injection event. The contrasted regions within the map 370 are indicative of the actual deviations of the delivered injected fuel mass from the respective desired injected fuel mass of the second fuel injection event, wherein the magnitudes of the actual deviations can be obtained by referencing key 380. Dashed vertical line 315 representing the selected injection duration respective to the first fuel injection event and region 365 representing the selected range of permissible injection durations respective to the second fuel injection event described above with reference to the second delivered injected fuel mass map 350 of FIG. 3-3 are depicted. As aforementioned, the second fuel injection event is influenced by the immediately preceding fuel injection event that is closely-spaced. Thus, the actual deviation from the respective desired injected fuel mass is determined for the second fuel injection event that is subsequent to the first fuel injection event using the respective injection duration selected for the preceding first fuel injection event and the respective injection duration (i.e., range of permissible injected durations) selected for the corresponding second fuel injection event.

In the illustrated embodiment of FIG. 3-4, the actual deviation of the second fuel injection event is equal to 0.5 mg based upon the selected respective injection durations of the first and second fuel injection events. In a non-limiting example, any deviations over 0.1 mg violate the deviation threshold. In another non-limiting example, ratios of the actual deviation to the respective desired injected fuel mass greater than 0.2 violate the deviation threshold. Accordingly, application of the second current waveform 220 to the first and second fuel injection events of the corresponding pair does not result in the respective delivered injected fuel mass repeatedly achieving the respective desired injected fuel mass for the second fuel injection event. Thus, the second current waveform 220 would not be selected as the desired current waveform. The exemplary mapping process can be executed for additional current waveforms applied to the same first and second fuel injection events of the consecutive pair to determine the desired current waveform. The current waveforms can be stored in the control module 60, and one of which, can include the first current waveform 210 of FIG. 2.

Referring to FIG. 4-1, a first delivered injected fuel mass map 410 and an injected fuel mass key 420 are illustrated with respect to the first current waveform 210 applied to the first fuel injection event of the consecutive pair, in accordance with the present disclosure. FIG. 4-1 is substantially similar to FIG. 3-1 where like numerals refer to like features. However, dashed vertical line 415 indicates that a longer injection duration (i.e., 425 ms) is required to meter the delivered injected fuel mass that achieves the desired injected fuel mass of 3 mg when the first current waveform 210 is applied to the first fuel injection event than the injection duration (i.e., 300 ms) required when the second current waveform was applied in FIG. 3-1.

FIG. 4-2 illustrates a second delivered injected fuel mass deviation map 430 and a deviation key 440 respective to the first fuel injection event of the consecutive pair when the first current waveform 210 of FIG. 2 is applied, in accordance with the present disclosure. FIG. 4-2 is substantially similar to FIG. 3-2 where like numerals refer to like features. Since the first fuel injection event is not influenced by any preceding fuel injection events, there is little to no deviation from the respective desired injected fuel mass. Thus, the determined actual deviation from the respective desired injected fuel mass for the first fuel injection event uses only the respective injection duration selected for the first fuel injection event.

Referring now to FIG. 4-3, a second delivered injected fuel mass map 450 and an injected fuel mass key 460 are illustrated with respect to the first current waveform 210 applied to the second fuel injection event of the consecutive pair, in accordance with the present disclosure. FIG. 4-3 is substantially similar to FIG. 3-3 where like numerals refer to like features. In the illustrated embodiment, since the second fuel injection event is subsequently closely-spaced in succession to the first fuel injection, the injection duration of the first fuel injection event influences the delivered injected fuel mass of the second fuel injected mass. In the illustrated embodiment, the region 465 is determined based on the selected injection duration of the first fuel injection event (i.e., dashed vertical line 415) and the delivered injected fuel mass that achieves the known respective desired injected fuel mass of the second fuel injection event obtained from the key 460. While the illustrated embodiment of FIG. 4-3 includes the same desired injected fuel mass respective to the second fuel injection event of about 2.5 mg as that when the second current waveform 220 is applied to the second fuel injection event described above with reference to FIG. 3-3, the range of permissible injection durations respective to the second fuel injection includes a range of longer durations from about 300 ms to about 333 ms when the first current waveform 210 is applied to the second fuel injection event. Accordingly, the second current waveform 220 delivers an injected fuel mass of 2.5 mg when the injection duration of the first fuel injection event is 425 ms and the injection duration of the second fuel injection event is within a range of about 300 ms to 330 ms.

FIG. 4-4 illustrates a second delivered injected fuel mass deviation map 470 and a deviation key 480 with respect to the first current waveform 210 of FIG. 2 applied to the second fuel injection event of the consecutive pair, in accordance with the present disclosure. FIG. 4-4 is substantially similar to FIG. 3-4 where like numerals refer to like features. In the illustrated embodiment of FIG. 4-4, the actual deviation of the second fuel injection event is little to none based upon the selected respective injection durations of the first and second fuel injection events. Accordingly, application of the first current waveform 210 to the first and second fuel injection events of the corresponding pair results in the respective delivered injected fuel mass repeatedly achieving the respective desired injected fuel mass for the second fuel injection event. Thus, the first current waveform 210 may be elected as the desired current waveform for both the first and second fuel injection events of the corresponding pair.

It will be appreciated that the exemplary mapping process of FIGS. 4-1 through 4-4 that selects the first current waveform 210 of FIG. 2 as the desired current waveform for both the first and second injection event is exemplary only, and not limiting. As aforementioned, alternative embodiments are envisioned wherein one or more other fuel injection events may include a respective desired current waveform that is different from respective desired current waveforms of the other plurality of fuel injection events. Optimizing selection of different desired current waveforms for one or more of a plurality of fuel injection events will not be discussed in detail herein. Further, the embodiments herein only illustrate the exemplary mapping process between two fuel injection events of a consecutive pair; however, it will be appreciated that mapping can be carried out between any two fuel injection events when the plurality of fuel injection events includes three or more fuel injection events. For instance, a triple fuel injection event can map the injection duration at which a desired injected fuel map respective to the third fuel injection event is achieved with the selected injection duration of one or more preceding fuel injection events, i.e., the second fuel injection event and/or the first fuel injection event. Further yet, the exemplary mapping process only applies to two current waveforms and one dwell time. It will be appreciated that the exemplary mapping process can apply any number of current waveforms stored in the control module 60 in order to determine the desired current waveform for a given dwell time. It is appreciated that different dwell times between consecutive pairs of closely-spaced fuel injection events will likely require different desired current waveforms selected. Accordingly, dwell times of interest may be identified in advance, wherein maps such as those illustrated in the non-limiting exemplary embodiments of FIGS. 3-1 to 3-4 and 4-1 to 4-4 are generated for each identified dwell time of interest. Thus, the maps are predetermined and stored within the control module 60, wherein the control module 60 may be executed to select the desired current waveform based on a required fueling schedule, i.e., desired injected fuel mass for each fuel injection event and dwell time(s) between each consecutive fuel injection event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an electromagnetically-activated fuel injector in an internal combustion engine, comprising:
    monitoring operation of the engine, the operation comprising a plurality of fuel injection events per cylinder per combustion cycle;
    when the monitored operation indicates a dwell time between two consecutive fuel injection events being less than a dwell time threshold,
        monitoring a respective desired injected fuel mass for each of the plurality of fuel injection events;
        selecting a desired current waveform from a plurality of current waveforms whereat each respective desired injected fuel mass is achieved based on at least one of the fuel injection events; and
        controlling the fuel injector using the desired current waveform;
    wherein the dwell time threshold is selected based upon calibrated short dwell times that cause instability in fuel injection mass.

2. The method of claim 1, wherein selecting the desired current waveform comprises:
    for each of the plurality of current waveforms:
        mapping injection duration versus delivered injected fuel mass for each fuel injection event;
        selecting a respective injection duration for each of the fuel injection events whereat a respective delivered injected fuel mass achieves the respective desired injected fuel mass based on the mapping; and
    selecting the desired current waveform whereat the respective delivered injected fuel mass repeatedly achieves the respective desired injected fuel mass for each fuel injection event.

3. The method of claim 2, wherein selecting the desired current waveform further comprises:
    for each fuel injection event that is subsequent to a first fuel injection event, selecting the desired current waveform whereat the respective delivered injected fuel mass repeatedly achieves the respective desired injected fuel mass using the respective injection duration for an immediately preceding fuel injection event.

4. The method of claim 2, wherein selecting the desired current waveform further comprises:
    for each fuel injection event that is subsequent to a first fuel injection event, selecting the desired current waveform whereat the respective delivered injected fuel mass repeatedly achieves the respective desired injected fuel mass using at least the respective injection duration for the first fuel injection event of the plurality of fuel injection events.

5. The method of claim 2, wherein the respective delivered injected fuel mass repeatedly achieves the respective desired injected fuel mass for each fuel injection event when the respective delivered injected fuel mass comprises an actual deviation from the respective desired injected fuel mass that violates a deviation threshold.

6. The method of claim 5, wherein the actual deviation from the respective desired injected fuel mass is determined by:
    mapping injection duration versus deviation from the respective desired injected fuel mass for each of the fuel injection events;
    determining the actual deviation from the respective desired injected fuel mass for a first fuel injection event using the respective injection duration selected for the first fuel injection event; and
    determining the actual deviation from the respective desired injected fuel mass for each fuel injection event that is subsequent to the first fuel injection event using the respective injection duration selected for at least one of the one or more preceding fuel injection events and the respective injection duration for the corresponding fuel injection event.

7. The method of claim 1, wherein the dwell time between consecutive fuel injection events defines a period of time between an end of injection for the first of the consecutive fuel injection events and a start of injection for the subsequent of the consecutive fuel injection events.

8. The method of claim 1, wherein the dwell time threshold is selected such that dwell times less than the dwell time threshold are indicative of producing instability in the fuel injection events.

9. The method of claim 1, wherein the plurality of fuel injection events comprise a first fuel injection event and two or more fuel injection events subsequent to the first fuel injection event.

10. Method for controlling an electromagnetically-activated fuel injector in an internal combustion engine, comprising:
    monitoring operation of the engine, the operation comprising a plurality of fuel injection events per cylinder per combustion cycle;
    for each fuel injection event of one or more consecutive fuel injection events having respective dwell times less than a dwell time threshold:
        monitoring a respective desired injected fuel mass to be delivered by the fuel injector;
        selecting a respective desired current waveform from a plurality of current waveforms, comprising
            for each of the plurality of current waveforms, mapping injection duration versus delivered injected fuel mass and selecting a respective injection duration whereat a respective delivered injected fuel mass achieves the respective desired injected fuel mass, and
            selecting the respective desired current waveform whereat the respective delivered injected fuel mass repeatedly achieves the respective desired injected fuel mass; and
    controlling the fuel injector using the respective desired current waveform selected for each fuel injection event of the one or more consecutive fuel injection events having respective dwell times less than the dwell time threshold;
wherein the dwell time threshold is selected based upon calibrated short dwell times that cause instability in fuel injection mass.

11. The method of claim 10, wherein the respective desired current waveforms selected for the fuel injection event are identical.

12. The method of claim 10, wherein the respective desired current waveforms selected for the fuel injection events comprise at least one of the fuel injection events having a respective desired current waveform that is different from each respective desired current waveform of the one or more other fuel injection events.

13. The method of claim 10, wherein selecting the respective desired current waveform whereat the respective delivered injected fuel mass repeatedly achieves the respective desired injected fuel mass comprises:
for each second fuel injection event of one or more consecutive pairs of fuel injection events, selecting the respective desired current waveform whereat the respective delivered injected fuel mass repeatedly achieves the respective desired injected fuel mass using the respective injection duration for the corresponding first fuel injection event of each consecutive pair.

14. The method of claim 10, wherein each of the plurality of current waveforms is characterized by an initial peak pull-in current and a secondary hold current.

15. The method of claim 10, wherein the respective delivered injected fuel mass repeatedly achieves the respective desired injected fuel mass for each fuel injection event when the respective delivered injected fuel mass comprises an actual deviation from the respective desired injected fuel mass that is less than a deviation threshold.

16. The method of claim 15, wherein the actual deviation from the respective desired injected fuel mass is determined by:
mapping injection duration versus deviation from the respective desired injected fuel mass for each of the fuel injection events;
determining the actual deviation from the respective desired injected fuel mass for a first fuel injection event using the respective injection duration for the first fuel injection event; and
determining the actual deviation from the respective desired injected fuel mass for each fuel injection event that is subsequent to the first fuel injection event using the respective injection duration for the one or more preceding fuel injection events and the respective injection duration for the corresponding fuel injection event.

17. The method of claim 10, further comprising:
selecting a fixed current waveform when the respective dwell times are at least the predetermined dwell time threshold.

* * * * *